No. 709,182. Patented Sept. 16, 1902.
E. W. STULL.
CONTROLLER FOR ELECTRIC MOTORS.
(Application filed June 10, 1901.)
(No Model.) 3 Sheets—Sheet 1.
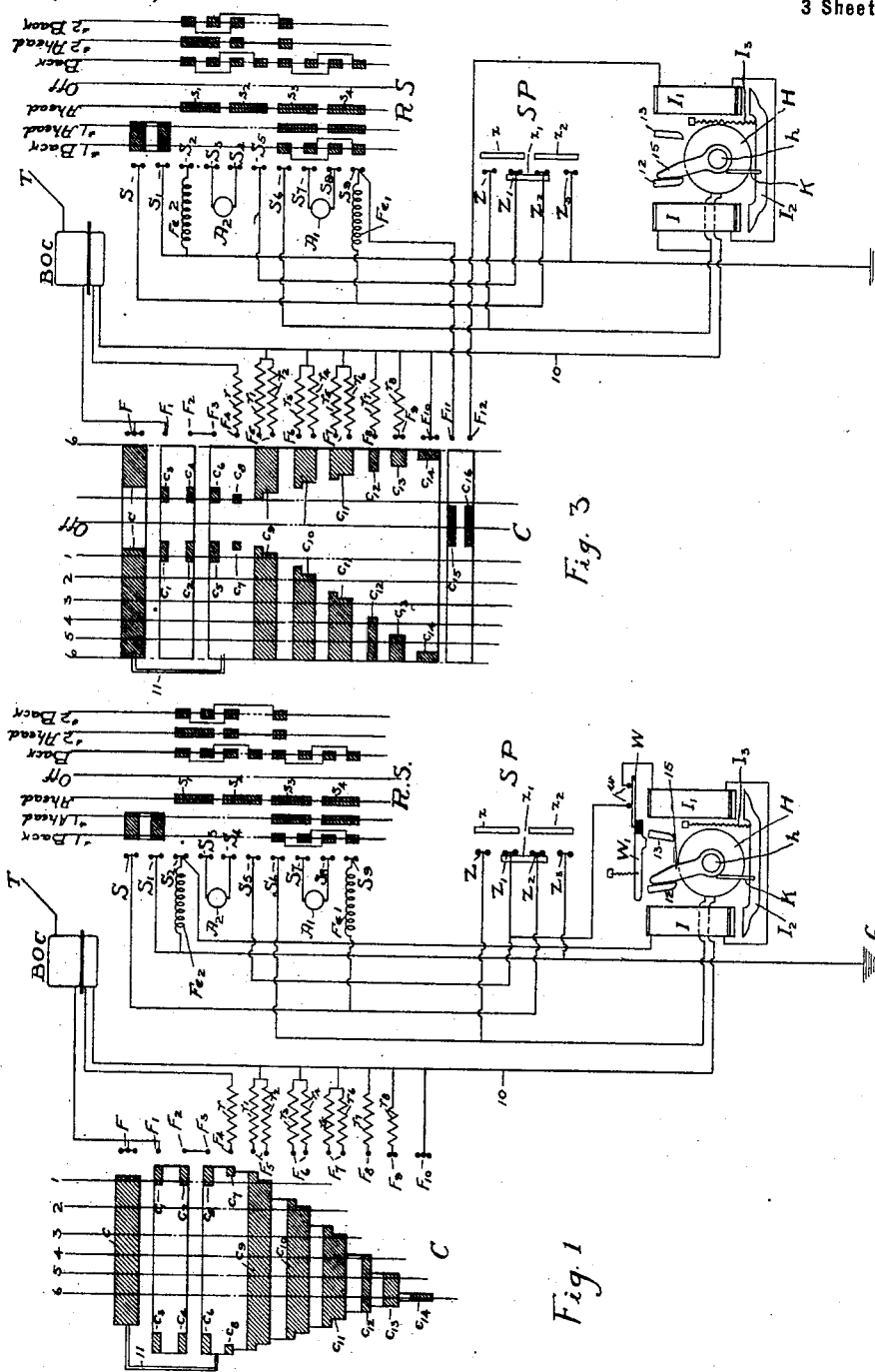
WITNESSES:
INVENTOR
E. W. Stull.
BY
Geo. H. Parmelee.
his ATTORNEY.

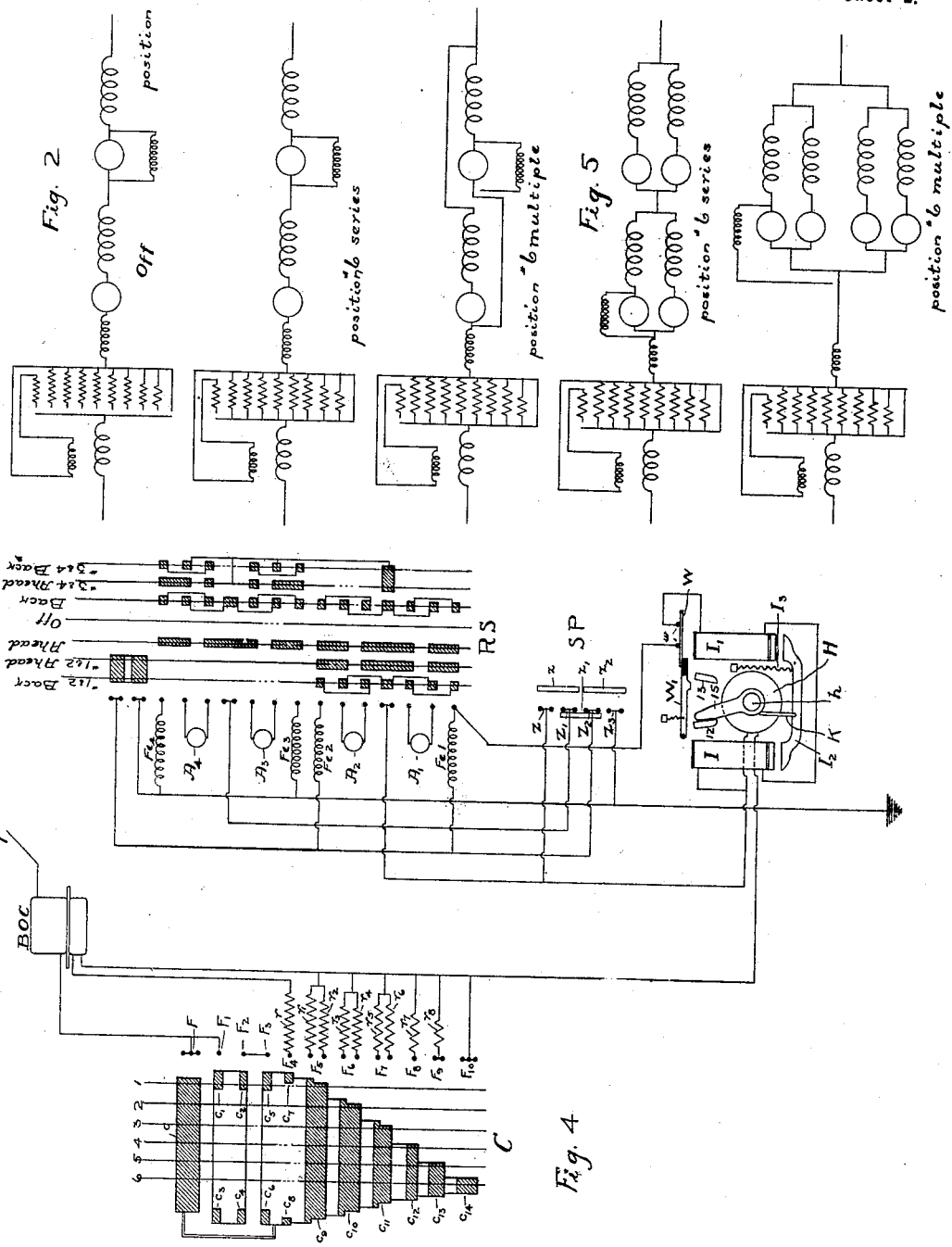

No. 709,182. Patented Sept. 16, 1902.
E. W. STULL.
CONTROLLER FOR ELECTRIC MOTORS.
(Application filed June 10, 1901.)
(No Model.) 3 Sheets—Sheet 3.
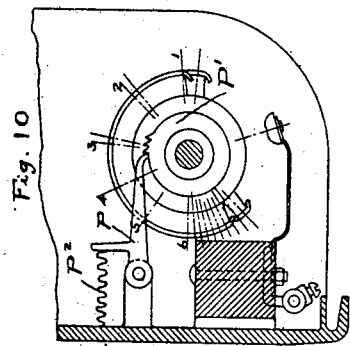
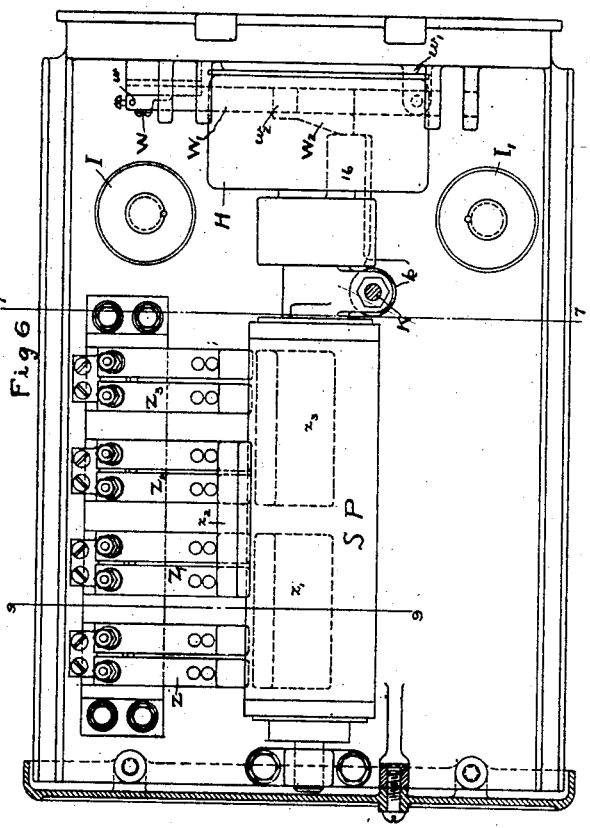
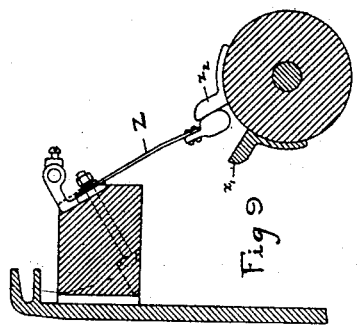
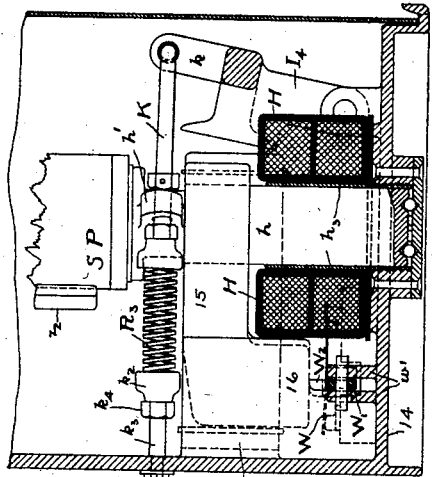
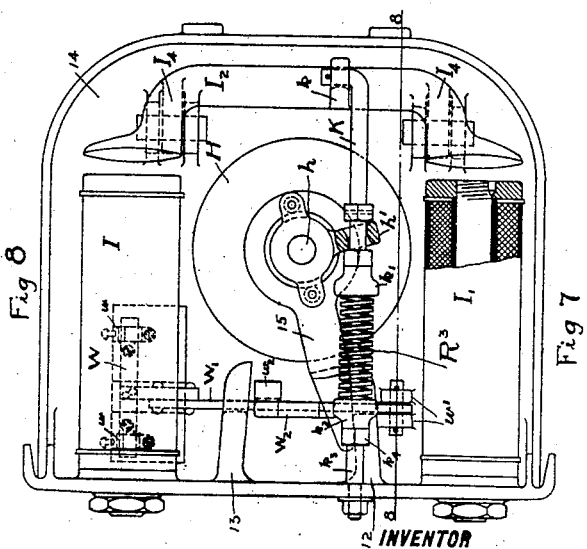
WITNESSES:
A. V. A. B. McCauley.
Cora G. Cox
INVENTOR
E. W. Stull,
BY Geo. H. Parmelee,
his ATTORNEY.
THE NORRIS PETERS CO., PHOTO-LITHO., WASHINGTON, D. C.

UNITED STATES PATENT OFFICE.

EMMETT W. STULL, OF JOHNSTOWN, PENNSYLVANIA, ASSIGNOR, BY MESNE ASSIGNMENTS, TO WESTINGHOUSE ELECTRIC AND MANUFACTURING COMPANY, OF PITTSBURG, PENNSYLVANIA, A CORPORATION OF PENNSYLVANIA.

CONTROLLER FOR ELECTRIC MOTORS.

SPECIFICATION forming part of Letters Patent No. 709,182, dated September 16, 1902.

Application filed June 10, 1901. Serial No. 63,840. (No model.)

*To all whom it may concern:*

Be it known that I, EMMETT W. STULL, of Johnstown, in the county of Cambria and State of Pennsylvania, have invented a new and useful Improvement in Controllers for Electric Motors, of which the following is a full, clear, and exact description, reference being had to the accompanying drawings, which form a part of this specification.

My invention relates to controllers for electric motors, and the particular embodiment thereof which I have herein shown and described is more especially designed for use in connection with motors of relatively large capacity running on circuits of comparatively high potential. The invention, however, is not limited to such use and can be employed with smaller motors on circuits of lower potential.

In the practice of my invention I employ a simple form of rheostatic switch, by means of which the speed of the motors may be regulated in both series and parallel relation thereof, and also a second mechanically-independent switch for coupling the motors or motor groups in either of such relations. This series-parallel switch is normally restrained from movement by the action of a magnet-coil included in the main motor-circuit and which is deënergized when that circuit is broken by the movement of the rheostatic switch across an open-circuit position thereof. This releases the series-parallel switch, and the latter is then moved from its series to its parallel position by the action of an electromagnet, whose coil or coils are included in circuit, forming a shunt to one of the motor-armatures and energized by current generated by the said armature, which during the open-circuit period of momentary duration is turning in a field due to residual magnetism. The open-circuit position of the rheostatic switch is preferably, although not necessarily, also its normal off position, and when said switch is allowed to remain at this position for a brief period the series-parallel switch if previously at its parallel position is automatically returned to series position by the action of a spring or it may be by gravity.

My invention also consists in certain novel features in the contact arrangement of the rheostatic switch whereby its mechanical construction and electrical connections are very materially simplified and also in the provision of a compound blow-out coil for said switch, which is so arranged as to have an increased strength at the time the full motor-current is broken.

My invention also consists in the novel construction, combination, and arrangement of parts, all as hereinafter described, and pointed out in the appended claims.

In the accompanying drawings, Figure 1 is a wiring diagram illustrating my invention as applied to the control of two motors, the rheostatic and series-parallel switches, together with the reversing and cut-out switch, being shown in development. Fig. 2 is a diagram showing graphically the circuits at certain positions of the rheostatic and series-parallel switches. Fig. 3 is a view similar to Fig. 1, but showing a slight modification. Fig. 4 is a similar view illustrating the invention as applied to the control of four motors. Fig. 5 is a diagram illustrating graphically the circuits at certain positions of the rheostatic and series-parallel switches of Fig. 4. Fig. 6 is an elevation (with a portion of the casing removed) showing the mechanical construction of the series-parallel switch and its restraining and actuating devices. Fig. 7 is a section on the line 7 7 of Fig. 6. Fig. 8 is a section on the line 8 8 of Fig. 7. Fig. 9 is a section on the line 9 9 of Fig. 6. Fig. 10 is a planular view of the rheostatic switch.

Referring first more particularly to Fig. 1, the letter C designates the development of the rheostatic switch, which switch is of general cylindrical form and is preferably of the usual type of mechanical construction in which the movable contacts are attached to castings or other pieces of which the body of the switch is composed. These contacts are designated by the reference characters $c$ $c'$ $c^2$, &c., to and including $c^{14}$. The coöperating fixed contact-fingers are designated by the reference characters F F' $F^2$, &c., to and including $F^{10}$.

$r$ $r'$ $r^2$, &c., to and including $r^8$ designate external resistance.

BOC is a compound blow-out coil composed of two separate coils, one of which is connected in series in the main circuit from the trolley connection T and the switch C and the other coil of which is connected in series with the resistance $r$ in the conductor 10, leading from the rheostatic switch to the motors.

The particular contact arrangement of the rheostatic switch is clearly shown in and will be best understood by reference to the diagram and therefore need not be described in detail. It will be noted that the switch has six running positions, (indicated by the numbered broken vertical lines 1 to 6, inclusive.) Beyond position 6 and between it and position 1 is an open-circuit position. The rotary movement of the switch is unrestricted, except in the particular hereinafter described, and it may be moved to its open-circuit position from one of its intermediate positions by movement in either direction. The same set of contacts are in this manner utilized for rheostatic control of the motors in both series and parallel relations thereof, thus reducing greatly the size of the switch and simplifying its construction. The contacts $c'$, $c^2$, $c^3$, and $c^4$, which form a separate group, together with the corresponding fingers $F'$, $F^2$, and $F^3$, are used simply to increase the number of breaks in the circuit passing in either direction to the open-circuit position. The upper or trolley contact $c$ is connected to the main group of contacts around the group just mentioned by the conductor 11. This connection 11 obviates the necessity for continuing the contacts of the said group across all the positions of the drum and correspondingly reduces the friction of the switch in operation. The contacts $c^5$ and $c^6$, with the corresponding finger $F^3$, which is connected to the finger $F^2$, are also used only for the purpose of increasing the number of breaks in passing to the off position. Contacts $c^7$ and $c^8$ are very short contacts, which are momentarily engaged by the finger $F^4$ in passing to and from the open-circuit position in either direction and serve to momentarily connect in circuit the resistance $r$ and the additional blow-out coil at such times. Inasmuch as at these times the entire current must pass through the resistance $r$, the volume of the current is considerably reduced just prior to opening the circuit, and the additional blow-out coil is also made effective. The other sections of resistance are, as clearly shown, connected in multiple between the fingers $F^5$, $F^6$, $F^7$, $F^8$, and $F^9$ and the conductor 10. Fingers $F^5$, $F^6$, and $F^7$ are each double fingers, and each member of each finger has a section of resistance connected thereto, the edges of the corresponding contacts being notched, as shown, so that one member of each double finger makes its contact engagement and introduces its connected resistance into the circuit momentarily before the contact engagement of the other member. These resistance-sections are graduated in carrying capacity, as indicated in the diagram, and the manner in which the number of sections in parallel with each other is successively increased in passing from position 1 to position 6 and decreased in passing from position 6 to the open-circuit position is fully apparent in the diagram. At position 6 the entire resistance is short-circuited through the contact $c^{14}$ and finger $F^{10}$. This finger and also the trolley-finger F, both of which are at times required to carry the full volume of current, are made of large capacity, being preferably triple fingers, as indicated. Finger $F^9$, which, owing to the relatively low resistance of $r^8$, is also called upon to carry a large volume of current, is also of larger capacity. The combined reversing and cut-out switch R S is in general of the well-known type, which provides not only for the reversal of both motors, but also for cutting out either motor and running with the remaining motor only in either direction. The several positions of this switch and the purpose of each position are clearly indicated on the drawings in order to enable the complete circuits to be readily traced. In tracing the circuits hereinafter it will be assumed that the contact-fingers $S^2$, $S^3$, $S^4$, $S^5$, $S^6$, $S^7$, $S^8$, and $S^9$ of this switch are engaging the contacts $s'$, $s^2$, $s^3$, and $s^4$ on the line marked "Ahead."

S P designates the series-parallel switch, whose movable contacts $z$, $z'$, and $z^2$ are mounted on a rotary drum or support, whose shaft is indicated on the diagram and also in Figs. 6, 8, and 9 by the letter $h$.

Z, Z', $Z^2$, and $Z^3$ are coöperating fixed contact-fingers, which, like the fingers of the switches C and R S, are made of large carrying capacity. When the switch S P is in the position shown in the drawings, the two motors, whose armatures are indicated on the diagram by the reference characters $A'$ $A^2$ and their field-coils $Fe'$ and $Fe^2$, are connected in series. At the base of this switch and preferably surrounding its shaft $h$ is a coil H, which is included in the conductor 10 and which has exterior pole-pieces 12 and 13, which are secured to or form part of an inclosing casing 14, in which the shaft $h$ has its bearings. Rigidly secured to the said shaft just above the coil H is an arm 15, of magnetic material, which extends between the two pole-pieces 12 and 13 and which forms a part of the magnetic circuit of the coil through said pole-pieces. Thus when the said arm is in contact with the pole-piece 12, as indicated in full lines in Fig. 1, the magnetic circuit from the upper part of the coil passes through the arm to said pole-piece, thence to the casing, and back to the coil, the effect being to hold the arm and shaft fixed in that position, owing to the magnetic attraction of the arm 15 and pole-piece 12. When the arm 15 is moved over to the pole-piece 13, there is effected a similar circuit through that pole-piece, and the arm and shaft are in a similar manner held in that position, which connects the two motors in multiple. The means just described form, therefore, a magnetic lock for holding the series-parallel switch in both its series and parallel positions.

I and I' designate two electromagnets at opposite sides of the coil H. The coils of these magnets, which are connected in series with each other, are connected between the contact-fingers $S^2$ and $S^5$ of the switch R S and are thus placed in shunt to the armature $A^2$ of one of the motors. These coils are wound with a considerable number of turns of comparatively fine wire.

$I^2$ is an armature common to the two magnets I and I' and normally held away from the same by the action of a spring $I^3$. K indicates a push connection between the said armature and the shaft $h$. The mechanical construction and arrangement of the parts now being described will be best understood by reference to Figs. 8 and 9, in which corresponding parts are given the same reference letters or characters as in the diagrams. The armature-bar $I^2$ is carried by the two pivoted arms $I^4$, and the push-bar K is connected at $k$ to the armature-bar and at its other end is adjustably connected with a short crank-arm $h'$ on the shaft $h$. The compression-spring $I^3$ is held between a cup $k'$ on the end of the bar K and a similar cup $k^2$, which is adjustably secured on a fixed bolt $k^3$ by a nut $k^4$.

It will be noted from the diagram Fig. 1 that a switch is interposed in the shunt-circuit which includes the coils of the magnets I and I'. This switch consists of two fixed contacts $w$ and a bridging-contact W, of spring material, carried by a bar W', which lies transversely underneath the arm 15 and is pivoted to the casing at $w'$. Secured to this bar W', which is of magnetic material, is a cam-block $W^2$, of non-magnetic material, such as brass, which is arranged to be impinged by a depending projection 16 of the arm 15 when the series-parallel switch S P is in its series position, thus forcing the bridging-contact W into engagement with the fixed contacts $w$ and closing the shunt-circuit. When the arm 15 is moved over into engagement with the pole-piece 13, the projection 16 will stand over the low portion of the cam-face of the block $W^2$ and over an offset or lug $w^2$ of the bar W', and the magnetism in said arm and projection due to the coil H is sufficient to attract the bar W' and raise it, thus breaking the circuit at $w$. As soon as the series-parallel switch is moved back to its series position the bar W' will be forced downwardly to again complete said circuit. The purpose of this switch is to prevent the magnet-coils I and I' from carrying useless current when the motors are in multiple.

It will be seen from Fig. 8 that a fixed bushing $h^3$, of brass or other non-magnetic material, surrounds the shaft $h$, its purpose being to not only center the said shaft, but also to form a short gap in the magnetic circuit, and thus tend to destroy somewhat the residual magnetism of such circuit.

The first diagram of Fig. 2 shows graphically the general character of the controller and motor circuits when the rheostatic switch is at its off position. The motors being at rest and the rheostatic switch being moved to position 1, the circuit is from the trolley connection T through the main coil of the blow-out to contact-finger F, contact $c$, thence to contact $c^9$, finger $F^4$, through resistance $r'$ and $r^2$ in multiple, to conductor 10, to and through coil H, to finger $S^6$ of the combined reversing and cut-out switch, to contact $s^3$, finger $S^7$, armature A', finger $S^8$, contact $s^4$, finger $S^9$, field Fe', to contact-finger $Z^2$, contact $z'$, finger Z', finger $S^5$, contact $s^2$, finger $S^4$, armature $A^2$, finger $S^3$, contact $s'$, field $Fe^2$, to ground, there being also a shunt-circuit around the armature $A^2$ through the magnet-coils I I', as previously described. As the rheostatic switch is moved successively through its different positions the only change in the circuit is to successively include additional sections of resistance in multiple until at position 6 the entire resistance is short-circuited by the engagement of finger $F^{10}$ with the contact $c^{14}$. The magnet-coils I I' being of fine wire and of comparatively large resistance, but little current will initially flow through these coils; but the volume will gradually increase as the counter electromotive force of the armature $A^2$ increases. The magnets I I', however, will not at any time acquire sufficient strength to enable them to overcome the action of the lock-coil H and the spring $I^3$ so long as the circuit through the coil H remains unbroken. When, however, the rheostatic switch is moved across its open-circuit position, the circuit through the coil H is broken, leaving the magnet-coils I I' still in shunt with the armature $A^2$, and said armature, which is turning in a residual field, will generate sufficient current to enable said coils (coil H now being dead) to overcome the action of the spring $I^3$ and attract the armature $I^2$, thereby moving the series-parallel switch to its parallel position, and thus connect the two motors in multiple, as indicated in the third diagram of Fig. 2. The rheostatic switch is then again moved through its successive positions as before. If this switch is brought to rest at its off position, the energy of the magnet-coils I I' will almost immediately die out and the spring $I^3$ will act to return the series-parallel switch to the series position ready for the next start.

The arrangement shown in the diagram of Fig. 3 is in general similar to that of Fig. 1, with the exception that instead of the shunt-circuit for the magnet-coils I I' being completed through an auxiliary switch, as shown in Fig. 1, such circuit is completed by means of two contacts $c^{15}$ and $c^{16}$ on the rheostatic switch and coöperating contact-fingers $F^{11}$ $F^{12}$. For convenience in this diagram the shunt-circuit including the said coils is made around the armature $A'$ instead of the armature $A^2$, as in the diagram of Fig. 1. This, however, is obviously immaterial. The two contacts $c^{15}$ and $c^{16}$ are placed at the off position of the rheostatic switch in a group by themselves, (the development being in this figure made to show the open-circuit position.) It follows, therefore, that the said shunt-circuit is completed only when the rheostatic switch is being moved across its open position. In some respects this is an improvement over the arrangement shown in Fig. 1, inasmuch as the magnet-coils are prevented from drawing useless current and may also be made of fewer turns and lower resistance. On the other hand, there is an advantage in the arrangement shown in Fig. 1, due to the fact that the shunt-current already flowing through the magnet-coils has overcome the self-induction of those coils and enables them to act more quickly when the circuit is opened as described.

The arrangement shown in Fig. 4 is similar in all respects to that shown in Fig. 1 except that it is adapted to the control of four instead of two motors, which involves a corresponding increase in the number of contacts and contact-fingers of the combined reversing and cut-out switch R S. Fig. 5 shows clearly the character of the circuits in both series and multiple relations of the motors. It is unnecessary to trace these circuits in detail, as they are clearly indicated on the drawings.

While, as hereinbefore stated, the drum of the rheostatic switch is so far unrestricted that the off position of the switch may be reached by movement in either direction from a running position in order to prevent movement in either direction from the off position, I provide the shaft $h$ with a disk $P'$, having teeth arranged to be engaged by a pawl $P^4$, held by a spring $P^2$. The engagement of this pawl is such, as will readily appear from Fig. 10, that the switch can only be moved in one direction from its off position, while leaving it free to move in either direction to its off position.

Although I have shown the series-parallel switch and its restraining and actuating devices as being inclosed in a casing which is structurally independent of the rheostatic switch, it is obvious that, if desired, all the switches may be included in one casing. It is also obvious that my invention is not limited to the particular mechanical constructions, combinations, and arrangements which I have herein shown and described for the purpose of presenting a complete embodiment of my invention, but that various mechanisms may be employed which will fulfil the conditions and requirements indicated by the diagram views and which will be clearly within the spirit and scope of my invention, and I have pointed out the same in the appended claims.

Having thus described my invention, what I claim as new, and desire to secure by Letters Patent, is—

1. In controlling mechanism for electric motors, the combination of a rheostatic switch, a mechanically-independent series-parallel switch, actuating means for the last-named switch operated by current derived from one of the motors temporarily acting as a generator for that purpose, and restraining means for said series-parallel switch controlled by the rheostatic switch.

2. In controlling mechanism for electric motors, the combination of a rheostatic switch having an open-circuit position, a separate series-parallel switch, a magnet or magnets for actuating said series-parallel switch connected in shunt with one of the motor-armatures, and means for preventing effective action of said magnet or magnets so long as the motor-circuit remains unbroken by the rheostatic switch, and means for utilizing such action to move the series-parallel switch from its series to its parallel position when the rheostatic switch is moved across its open-circuit position.

3. In controlling mechanism for electric motors, the combination of a rheostatic switch, having an open-circuit position, a separate series-parallel switch, a magnet or magnets for actuating said series-parallel switch connected in shunt with one of the motor-armatures, and means for preventing effective action of said magnet or magnets so long as the motor-circuit remains unbroken by the rheostatic switch, and means for utilizing such action to move the series-parallel switch from its series to its parallel position when the rheostatic switch is moved across its open-circuit position, together with suitable means, as a spring, for returning the series-parallel switch to series position when the rheostatic switch is brought to rest at its open-circuit position.

4. In controlling mechanism for electric motors, the combination of a manually-operated rheostatic switch having an open-circuit position, a separate series-parallel switch, means for automatically actuating said series-parallel switch in one direction by a movement of the rheostatic switch across its open-circuit position, and means for automatically actuating it in the opposite direction when the rheostatic switch is rested at its open-circuit position.

5. In controlling mechanism for electric motors, the combination of a rheostatic switch, a separate series-parallel switch, means for automatically actuating said series-parallel switch controlled by the movement of the rheostatic switch, and means for restraining such actuating means except under certain conditions, such restraining means being also controlled by the movement of the rheostatic switch.

6. In controlling mechanism for electric motors, the combination of a rheostatic switch having an open-circuit position, a separate series-parallel switch, means for automatically actuating said series-parallel switch controlled by the movement of the rheostatic switch, and electromagnetic restraining means for the series-parallel switch having its coil included in the main motor-circuit.

7. In controlling mechanism for electric motors, the combination of a rheostatic switch, having an open-circuit position, a separate series-parallel switch, an electromagnet having its coil or coils connected in shunt with an armature of one of the motors, an operative connection between the armature of said magnet and the series-parallel switch, and means for restraining the movement of the series-parallel switch except when the circuit is opened at the rheostatic switch.

8. In controlling mechanism for electric motors, the combination with a switch for connecting motors, or motor groups, in both series and parallel relation, of an electromagnet having one or more coils in shunt to one of the motor-armatures, a mechanical connection between the armature of said magnet and the movable member of said switch for moving the switch in one direction, a spring for actuating the switch in the opposite direction, and means whereby said magnet is effective only when the motor-circuit is opened and its coil or coils are energized by current generated by said armature turning in the residual field of the motor.

9. In controlling mechanism for electric motors, the combination with a series-parallel switch, and electromagnetic means for actuating the same, of a coil adjacent to said switch and included in the main circuit to the motors, pole-pieces exterior to said coil, and an arm of magnetic material attached to the movable member of said switch and extending between said pole-pieces, said arm forming a part of the magnetic circuit from the coil through said pole-pieces.

10. In controlling mechanism for electric motors, the combination with a series-parallel switch, and an electromagnet for actuating the said switch, having its coil or coils arranged to be connected in shunt with a motor-armature, of a coil connected in the main circuit to the motors, a pair of pole-pieces adjacent to the said coil, an arm connected to the movable member of said switch and extending between the said pole-pieces, said arm forming a part of the magnetic circuit from the coil to the pole-pieces, and an auxiliary switch arranged to close the shunt circuit of the magnet coil or coils at predetermined times.

11. In controlling mechanism for electric motors, the combination with a series-parallel switch, an electromagnet for actuating the same, having its coil or coils arranged to be connected in shunt with a motor-armature, and an auxiliary switch for effecting such connection, of a coil connected in the main circuit to the motors, a pair of pole-pieces adjacent to the said coil, and an arm connected to the movable member of the said switch and extending between the said pole-pieces, said arm forming a part of the magnetic circuit from the coil to the pole-pieces, and also arranged to operate the said auxiliary switch.

12. In controlling mechanism for electric motors, the combination of a rheostatic switch, having an open-circuit position, a separate series-parallel switch, an electromagnet for actuating the said switch, said magnet having its coil or coils included in a shunt around one of the motor-armatures, and means whereby said magnet is effectually energized only when the motor-circuit is broken and the said armature is turning in a residual field of the motor, said rheostatic switch having an open-circuiting position which can be reached by movement of said switch in either direction, whereby the same set of movable switch-contacts are used for rheostatic control for both series and multiple relations of the motors.

13. In mechanism for the control of electric motors, a rheostatic switch having a compound blow-out coil, one part of which is always in series with the motors, and the other part of which is placed in series with the first part at the time the said switch is moved to its off position.

14. In mechanism for the control of electric motors, a rheostatic switch arranged to successively connect a number of resistance-coils in multiple in the motor-circuit, and to remove the same, of a blow-out coil therefor composed of two members, one of which is always in series with the motors, and the other of which is connected in series with a resistance-coil, and contacts in said switch for placing the last-named member of the blow-out coil and also the said resistance-coil in series with the motors as the switch is moved to its off position.

15. In mechanism for the control of electric motors, a rheostatic switch having a main group of contacts for connecting resistance in various ways to the motor-circuit, a secondary group of short contacts arranged to insert additional resistance in series in the motor-circuit just previous to breaking such circuit, and connections leading from the supply-conductor to each of said groups.

In testimony whereof I have affixed my signature in presence of two witnesses.

EMMETT W. STULL.

Witnesses:
CORA G. COX,
H. W. SMITH.